(12) United States Patent
Sundararajan et al.

(10) Patent No.: US 12,726,520 B2
(45) Date of Patent: Sep. 1, 2026

(54) ENTITY POLICY CONTEXTS FOR SECURE DNS RESOLUTION

(71) Applicant: McAfee, LLC, San Jose, CA (US)

(72) Inventors: Rajagopalan Sundararajan, Banaglore (IN); Premananda Das, Marathahalli (IN)

(73) Assignee: McAfee, LLC, San Jose, CA (US)

( * ) Notice: Subject to any disclaimer, the term of this patent is extended or adjusted under 35 U.S.C. 154(b) by 108 days.

(21) Appl. No.: 18/401,194

(22) Filed: Dec. 29, 2023

(65) Prior Publication Data

US 2025/0220048 A1 Jul. 3, 2025

(51) Int. Cl.

| | |
|---|---|
| ***H04L 61/4511*** | (2022.01) |
| ***G06F 15/16*** | (2006.01) |
| ***H04L 9/14*** | (2006.01) |
| ***H04L 9/32*** | (2006.01) |
| ***H04L 9/40*** | (2022.01) |
| ***H04L 12/28*** | (2006.01) |
| ***H04L 15/16*** | (2006.01) |
| ***H04L 29/12*** | (2006.01) |

(52) U.S. Cl.

CPC .......... *H04L 63/20* (2013.01); *H04L 61/4511* (2022.05); *H04L 63/0272* (2013.01)

(58) Field of Classification Search

CPC ... H04L 63/20; H04L 61/4511; H04L 63/0272

USPC .............................................................. 726/1

See application file for complete search history.

(56) References Cited

U.S. PATENT DOCUMENTS

2007/0194884 A1* 8/2007 Didier .................... G07C 9/257 340/5.82
2012/0151057 A1* 6/2012 Paredes ............... H04L 63/0272 709/225
2014/0297537 A1* 10/2014 Kassemi ............. G06Q 20/401 705/67
2015/0150109 A1* 5/2015 Bocanegra .......... H04L 63/0807 726/9
2021/0029074 A1* 1/2021 Buck ................... H04L 63/0407
2021/0250349 A1* 8/2021 Konda .................. H04L 63/083
2022/0210114 A1* 6/2022 Buck ....................... H04L 63/10
2023/0069337 A1* 3/2023 Lee ...................... H04L 61/4511
2023/0283594 A1* 9/2023 Uzkuras .............. H04L 43/0852 726/15
2023/0353362 A1* 11/2023 Dyer ................... H04L 63/0861
2023/0353574 A1* 11/2023 Payment ............... H04L 63/062
2024/0106861 A1* 3/2024 Ahn ...................... H04L 63/102
2024/0121214 A1* 4/2024 Childers ............. H04L 63/0236
2024/0388443 A1* 11/2024 Zemla ................... H04L 9/3247

* cited by examiner

*Primary Examiner* — Berhanu Shitayewoldetsadik
(74) *Attorney, Agent, or Firm* — Patent Capital Group

(57) ABSTRACT

There is described herein a computer-implemented system and method for providing domain name system (DNS) over hypertext transfer protocol secure (HTTPS) (DoH) resolution for a domain, including forming a DoH query for an entity, comprising inserting an entity access token into a uniform resource identifier (URI) template; sending the DoH query to a DoH service; resolving the DoH query, comprising using the entity access token to determine an entity context policy for the DoH query; and returning a DoH response that enacts the entity context policy.

20 Claims, 8 Drawing Sheets

SSP 190
DoH SERVER 212
POLICY SERVICE 216
TOKEN SERVICE 220
CLIENT DEVICE 110
APPLICATION 204
DoH CLIENT 208
200
[1] USER AUTHENTICATION
[2] USER ACCESS TOKEN/ CONFIGURE DoH SERVICE
[3] DNS QUERY
[4] ADD UAT TO URI TEMPLATE
[5] SEND DoH REQUEST
[6] ATTEST/ AUTH UAT
[7] AUTH FAIL/EXPIRED
[8] FAIL
[9] FETCH USER POLICY CONTEXT
[10] USER POLICY
[11] RESOLVED ADDRESS WITH USER POLICY
[12] ENACT POLICY

MEMORY 604
PROC1 602-2
PROC0 602-1
612
CHIPSET 616
GRAPHICS 622
600
MEMORY 604-1
OPERATING SYSTEM 606
OPERATIONAL AGENTS 608
DATA 612
628
AUDIO I/O 642
STORAGE 650
I/O DEVICES 635
BUS BRIDGE 632
ACCELERATORS 646
COMMUNICATION DEVICES 640
KB/MOUSE 638

ENTITY POLICY CONTEXTS FOR SECURE DNS RESOLUTION

FIELD OF THE SPECIFICATION

This application relates in general to data privacy, and more particularly though not exclusively to a system and method for providing Entity Policy Contexts for Secure DNS Resolution.

BACKGROUND

Domain Name System (DNS) is a method in which a domain name (e.g., of the form "uspto.gov") is resolved into an internet protocol (IP) address, which a networked application can use for its actual communications. Legacy DNS protocols are unencrypted.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
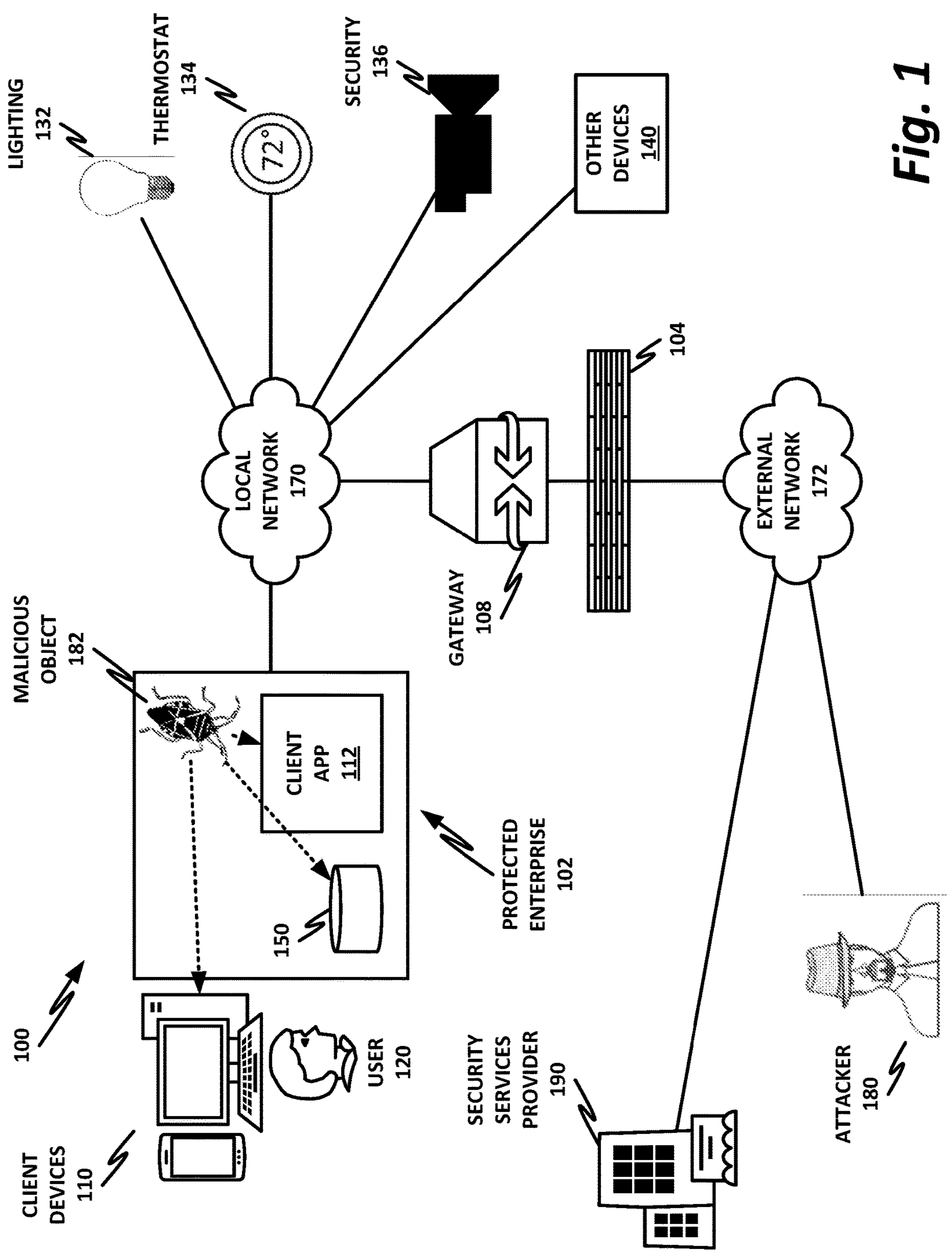
FIG. 1 is a block diagram of selected elements of a security ecosystem.

There is described herein a computer-implemented system and method for providing domain name system (DNS) over hypertext transfer protocol secure (HTTPS) (DoH) resolution for a domain, including forming a DoH query for an entity, comprising inserting an entity access token into a uniform resource identifier (URI) template; sending the DoH query to a DoH service; resolving the DoH query, comprising using the entity access token to determine an entity context policy for the DoH query; and returning a DoH response that enacts the entity context policy.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Overview

In the modern information age, users are increasingly concerned about data privacy. Government statutes and regulations have also become stricter regarding user privacy. In this context, the legacy domain name system (DNS) protocol has become outdated for many purposes. The legacy DNS protocol sends an unencrypted or plain-text message via, for example, port 53, with a DNS query that asks for a public IP address that corresponds to a given domain name. The DNS server then returns a DNS response that provides the IP address, and the client may then cache the resolved domain name for, e.g., 24 hours.

Because legacy DNS queries are unencrypted, the legacy DNS protocol can have serious privacy implications. For example, a wire sniffer may be used to spy on a user's DNS queries, and infer information about the user's browsing habits based on those DNS queries. Furthermore, DNS query data may be gathered so that they can be bought, sold, shared, or otherwise distributed by so-called spyware.

To address issues with DNS privacy, the DNS protocol has evolved in recent years. For example, in 2018 the Internet engineering task force (IETF) issued a proposed standard (RFC 8484) that defined secure DNS queries over secure hypertext transfer protocol (HTTPS). This protocol is abbreviated DNS over HTTPS (DOH). With DoH, because DNS queries and their responses are encrypted, user privacy is better preserved. With these advantages, DoH is being widely adopted by many OS platforms and vendors. A properly secured DoH transaction can provide end-to-end privacy and confidentiality of the DNS queries initiated by the user device.

However, DoH also presents new challenges, particularly in the context of managed devices or connections. In the case of an enterprise, small business, family, or other group, it may be desirable to restrict users from visiting certain websites, or to otherwise manage DNS traffic. For example, with a family or a business, certain websites may be outright blocked on the network. Other websites may be allowed with a warning, or be subjected to quotas or traffic restrictions. In legacy DNS systems, policy enforcement could be handled at the gateway, which often hosted its own caching DNS server. When client devices performed a DNS query, the gateway would first check the domain name against its list of domain name policies, and would return a policy enforcement instead of or along with the resolved domain name. For example, if the domain name was blocked, the caching DNS server could simply direct the query to a block page. If the domain name was subject to a different policy, then the caching DNS server may resolve the domain name and pass the content through the network, but may also provide a warning, or apply a different policy to manage the traffic.

In at least some conditions, it is desirable to continue to provide contextual DNS policies to users, groups, devices, business units, enterprises, or other entities, while still providing the privacy benefits of DoH. To this end, security services providers or other service providers may provide their own DNS services that—in addition to providing domain name resolution—also provide the desired policy enforcement for the family or enterprise. While such services may provide a monolithic or unitary DNS policy for a family or enterprise, it may also be desirable to provide contextual or entity-specific DNS policies. Thus, it is possible to enable a particular domain name or group of domain names for one user or group, and disable those same domain names for a different user or group.

To provide a personalized security policy enforcement mechanism, the present specification provides a DoH interface with a user context embedded within the DoH request. In a particular example, the user context is encoded within a DoH query that is fully compliant with the DoH protocol specification. This enables the user to receive a contextualized policy enforcement via the DoH interface.

In one illustrative example, the system may use the URI template mechanism of RFC 8484 (3) and RFC 6570 to derive a final URL that can be used to query the DoH server. The DoH client software may identify a template to be used based on a configuration or other out-of-band discovery and/or configuration mechanism, such as DHCP, selective VPN configuration, or DNS service discovery. The DoH client software may inject the user context into a URI template for a DNS service that has been configured or discovered. Thus, requests made over DoH can be associated with a particular entity. In this specification, a user is provided as an example of a contextual entity, and an associated "user access token" (UAT) is described, but this can be generalized into any entity with an entity access token (EAT). Other entities may include devices, user groups, business units, organizations, and enterprises, by way of illustrative and nonlimiting example.

The teachings of the present specification enable associating a user context for DNS queries sent over DoH, within the existing provision of the DoH standard. This may enable DNS security vendors to evaluate a wide variety of personalized policies for users or other entities. Policies may include, but way of illustrative and nonlimiting example:

Security policies with user preferences.

User-specific allow lists or block lists.

Parental time controls.

Parental category controls.

For example, parents may wish to restrict their children to visiting only academic related websites during a time window in which the children are expected to do homework, such as between 6 and 8 PM. Parents may also wish to completely block Internet access during a lights-out period, such as 10:30 PM to 6:30 AM. At other times, the children may be permitted general access to the Internet, but certain categories of websites such as pornography, hate, illegal content, and others may be blocked.

On the other hand, the parents may not have the time restrictions for themselves, but may still wish to block content from pornographic, hate, or illegal websites so that they do not accidentally reach content they do not want to see. Thus, the parents can define user-specific policies for themselves and for their children, and provide those to a cloud service that performs DoH resolution. When a user on a protected network attempts to reform a DNS query via DoH, the DoH packet includes a user context that identifies the user making the request. This can be used to enforce a user-specific policy for visiting different domain names.

In an illustrative example, the URI template is customized to contain a user specific DoH access token. The URI template may be made to look like:

https://dohservice.safedns.provider.com/<user-doh-access-token>/dns-query

The DoH access token may be self describing and self validating, and in some cases may have the form of a JSON web token (JWP). The user access token (UAT) may contain a user context, token timestamp, and a signature to validate its authenticity. The UAT may also have a specified expiry, after which the token is no longer valid. When the user makes a DoH query, the UAT is attached to the DoH query within the URI template. From the token, the DoH server may establish a user context in a safe and secure manner. Once the user context has been established, the DoH server can then fetch any policies available from a policy service and enforce them.

An illustrative structure of the DoH token includes:

<token-version>.<account-id>.<user-id>.<issued-timestamp>.<key-id>.<signature>

Where:

<token-version> is a two-character identity referring to the exact structure of the token.

<account-id> and <user-id> are a user contextual identifier associated with a user in an enterprise context. The identifiers can change and may vary from enterprise to enterprise.

<issued-timestamp> captures the timestamp when the DoH token was issued for this DoH client. This can be used to periodically purge older tokens to prevent the misuse of a leaked token.

<key-id> identifies a specific key used to create the <signature> part of the token. This key-id may be already known to the server. The server may use the key-id to cryptographically validate that the token content has not been modified.

<signature> is any signature that can establish the integrity of the token. Any suitable key-hashed message authentication code (HMAC) or digital signature algorithm may be used to create this signature. One such example is HMAC-SHA256.

The DoH token may then be encoded, such as base64, or base64-url (a URL-safe version of base64), so that it can be safely conveyed in the URL.

Selected Examples

The foregoing can be used to build or embody several example implementations, according to the teachings of the present specification. Some example implementations are included here as nonlimiting illustrations of these teachings.

There is disclosed in an example, a computer-implemented method of providing domain name system (DNS) over hypertext transfer protocol secure (HTTPS) (DoH) resolution for a domain, comprising: forming a DoH query for an entity, comprising inserting an entity access token into a uniform resource identifier (URI) template; sending the DoH query to a DoH service; resolving the DoH query, comprising using the entity access token to determine an entity context policy for the DoH query; and returning a DoH response that enacts the entity context policy.

There is disclosed another example, wherein the URI template is an RFC 8484 URI template.

There is disclosed another example, wherein the entity context policy comprises a policy to block access to the domain.

There is disclosed another example, wherein the entity context policy comprises a policy to warn on access to the domain.

There is disclosed another example, further comprising issuing the entity access token after the entity has authenticated.

There is disclosed another example, wherein the entity access token has an expiry.

There is disclosed another example, wherein the expiry is greater than one week.

There is disclosed another example, wherein the entity access token has the form of a JSON web token.

There is disclosed another example, wherein the entity access token is encoded in base64.

There is disclosed another example, wherein the entity access token is encoded in base64-url.

There is disclosed another example, wherein forming the DoH query comprises inserting a virtual private network (VPN) instance into a DoH service driver.

There is disclosed another example, wherein the VPN instance is segregated from a network data path.

There is disclosed another example, wherein the entity is a human user.

There is disclosed another example, wherein the entity is a user group.

There is disclosed another example, wherein the entity is a device.

There is disclosed another example, wherein the entity is a business unit.

There is disclosed another example, wherein the entity is an enterprise.

There is disclosed another example of an apparatus comprising means for performing the method.

There is disclosed another example, wherein the means for performing the method comprise a processor and a memory.

There is disclosed another example, wherein the memory comprises machine-readable instructions that, when executed, cause the apparatus to perform the method.

There is disclosed another example, wherein the apparatus is a computing system.

There is disclosed another example of at least one computer readable medium comprising instructions that, when executed, implement a method or realize an apparatus described.

There is disclosed another example of one or more tangible, nontransitory computer-readable storage media having stored thereon executable instructions to: provide a virtual private network (VPN) to interoperate with a domain name system (DNS) over hypertext transfer protocol secure (HTTPS) (DoH) resolution client, wherein the VPN is segregated from network data streams; receive, from an entity, a request to resolve a domain name; form a DoH query for an entity, comprising inserting an entity access token into a uniform resource identifier (URI) template; send the DoH query to a DoH resolution server; receive a response from the DoH resolution server, wherein the response includes an entity policy context for the domain name; and act on the entity policy context.

There is disclosed another example, wherein the URI template is an RFC 8484 URI template.

There is disclosed another example, wherein the entity policy context comprises a policy to block access to the domain name.

There is disclosed another example, wherein the entity policy context comprises a policy to warn on access to the domain name.

There is disclosed another example, wherein the entity access token is encoded in base64.

There is disclosed another example, wherein the entity access token is encoded in base64-url.

There is disclosed another example, wherein the entity access token has an expiry.

There is disclosed another example, wherein the expiry is greater than one week.

There is disclosed another example, wherein the entity access token is in the form of a JSON web token.

There is disclosed another example, wherein the entity is a human user.

There is disclosed another example, wherein the entity is a user group.

There is disclosed another example, wherein the entity is a device.

There is disclosed another example, wherein the entity is a business unit.

There is disclosed another example, wherein the entity is an enterprise.

There is disclosed another example of an endpoint device, comprising: a hardware platform comprising a processor circuit and a memory; an operating system, including a domain name system (DNS) over hypertext transfer protocol secure (HTTPS) (DoH) resolution client; and a contextual policy agent, comprising instructions encoded within the memory to instruct the processor circuit to: provide a virtual private network (VPN) to interoperate with the DoH resolution client; receive from an entity a request to resolve a domain name; form a DoH query for an entity, comprising inserting an entity access token into a uniform resource identifier (URI) template; send the DoH query to a DoH resolution server; receive a response from the DoH resolution server, wherein the response includes an entity policy context for the domain name; and act on the entity policy context.

There is disclosed another example, wherein the URI template is an RFC 8484 URI template.

There is disclosed another example, wherein the entity policy context comprises a policy to block access to the domain name.

There is disclosed another example, wherein the entity policy context comprises a policy to warn on access to the domain name.

There is disclosed another example, wherein the entity access token is encoded in base64.

There is disclosed another example, wherein the entity access token is encoded in base64-url.

There is disclosed another example, wherein the entity access token has an expiry.

There is disclosed another example, wherein the expiry is greater than one week.

There is disclosed another example, wherein the entity access token is in the form of a JSON web token.

There is disclosed another example, wherein the entity is a human user.

There is disclosed another example, wherein the entity is a user group.

There is disclosed another example, wherein the entity is a device.

There is disclosed another example, wherein the entity is a business unit.

There is disclosed another example, wherein the entity is an enterprise.

There is disclosed another example, wherein the endpoint device is a desktop or laptop computer.

There is disclosed another example, wherein the endpoint device is a smart phone.

There is disclosed another example, wherein the endpoint device is a tablet.

There is disclosed another example of one or more tangible, nontransitory computer-readable storage media having stored thereon instructions to provide a domain name system (DNS) over hypertext transfer protocol secure (HTTPS) (DoH) resolution server, the instructions to: receive, from a client device, a DoH resolution request for a domain on behalf of an entity, wherein the DoH resolution request includes an entity access token encoded within a URI template; resolve the domain, comprising using the entity access token to a context store and receive a policy context for the entity and the domain; and returning a DoH response, including information to enforce the policy context.

There is disclosed another example, wherein the URI template is an RFC 8484 URI template.

There is disclosed another example, wherein the policy context comprises a policy to block access to the domain.

There is disclosed another example, wherein the policy context comprises a policy to warn on access to the domain.

There is disclosed another example, wherein the instructions are further to receive an entity authentication, and issue the entity access token in response to the entity authentication.

There is disclosed another example, wherein the entity access token is base64 encoded.

There is disclosed another example, wherein the entity access token is base64-url encoded.

There is disclosed another example, wherein the entity access token has an expiry.

There is disclosed another example, wherein the expiry is greater than one week.

There is disclosed another example, wherein the entity access token has the form of a JSON web token.

There is disclosed another example, wherein the entity is a human user.

There is disclosed another example, wherein the entity is a user group.

There is disclosed another example, wherein the entity is a device.

There is disclosed another example, wherein the entity is a business unit.

There is disclosed another example, wherein the entity is an enterprise.

There is disclosed another example of a domain name system (DNS) over hypertext transfer protocol secure (HTTPS) (DoH) resolution server apparatus, comprising: a hardware platform comprising at least one processor circuit and at least one memory; and instructions encoded within the at least one memory to instruct the at least one processor circuit to: receive, from a client device, a DoH resolution request for a domain on behalf of an entity, wherein the DoH resolution request includes an entity access token encoded within a URI template; resolve the domain, comprising using the entity access token to a context store and receive a policy context for the entity and the domain; and returning a DoH response, including information to enforce the policy context.

There is disclosed another example, wherein the URI template is an RFC 8484 URI template.

There is disclosed another example, wherein the policy context comprises a policy to block access to the domain.

There is disclosed another example, wherein the policy context comprises a policy to warn on access to the domain.

There is disclosed another example, wherein the instructions are further to receive an entity authentication, and issue the entity access token in response to the entity authentication.

There is disclosed another example, wherein the entity access token is base64 encoded.

There is disclosed another example, wherein the entity access token is base64-url encoded.

There is disclosed another example, wherein the entity access token has an expiry.

There is disclosed another example, wherein the expiry is greater than one week.

There is disclosed another example, wherein the entity access token has the form of a JSON web token.

There is disclosed another example, wherein the entity is a human user.

There is disclosed another example, wherein the entity is a user group.

There is disclosed another example, wherein the entity is a device.

There is disclosed another example, wherein the entity is a business unit.

There is disclosed another example, wherein the entity is an enterprise.

There is disclosed another example, further comprising a virtualization infrastructure.

There is disclosed another example, further comprising a containerization infrastructure.

DETAILED DESCRIPTION OF THE DRAWINGS

A system and method for providing entity policy contexts for secure DNS resolution will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a small business, a charity, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Security ecosystem 100 may include one or more protected enterprises 102. A single protected enterprise 102 is illustrated here for simplicity, and could be a business enterprise, a government entity, a family, a nonprofit organization, a church, or any other organization that may subscribe to security services provided, for example, by security services provider 190.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 could be a simple home router, or could be a sophisticated enterprise infrastructure including routers, gateways, firewalls, security services, deep packet inspection, web servers, or other services.

In further embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features service function chaining (SFC) or NFV, gateway 108 may be include one or more service functions and/or virtualized network functions.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting malicious object 182 into client device 110. Once malicious object 182 gains access to client device 110, it may try to perform work such as social engineering of user 120, a hardware-based attack on client device 110, modifying storage 150 (or volatile memory), modifying client application 112 (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially-unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Protected enterprise 102 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include DoH services, including entity-specific policies. Those policies may, in some cases, base based at least in part on URL reputations, such as those provided by the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Figure 2:
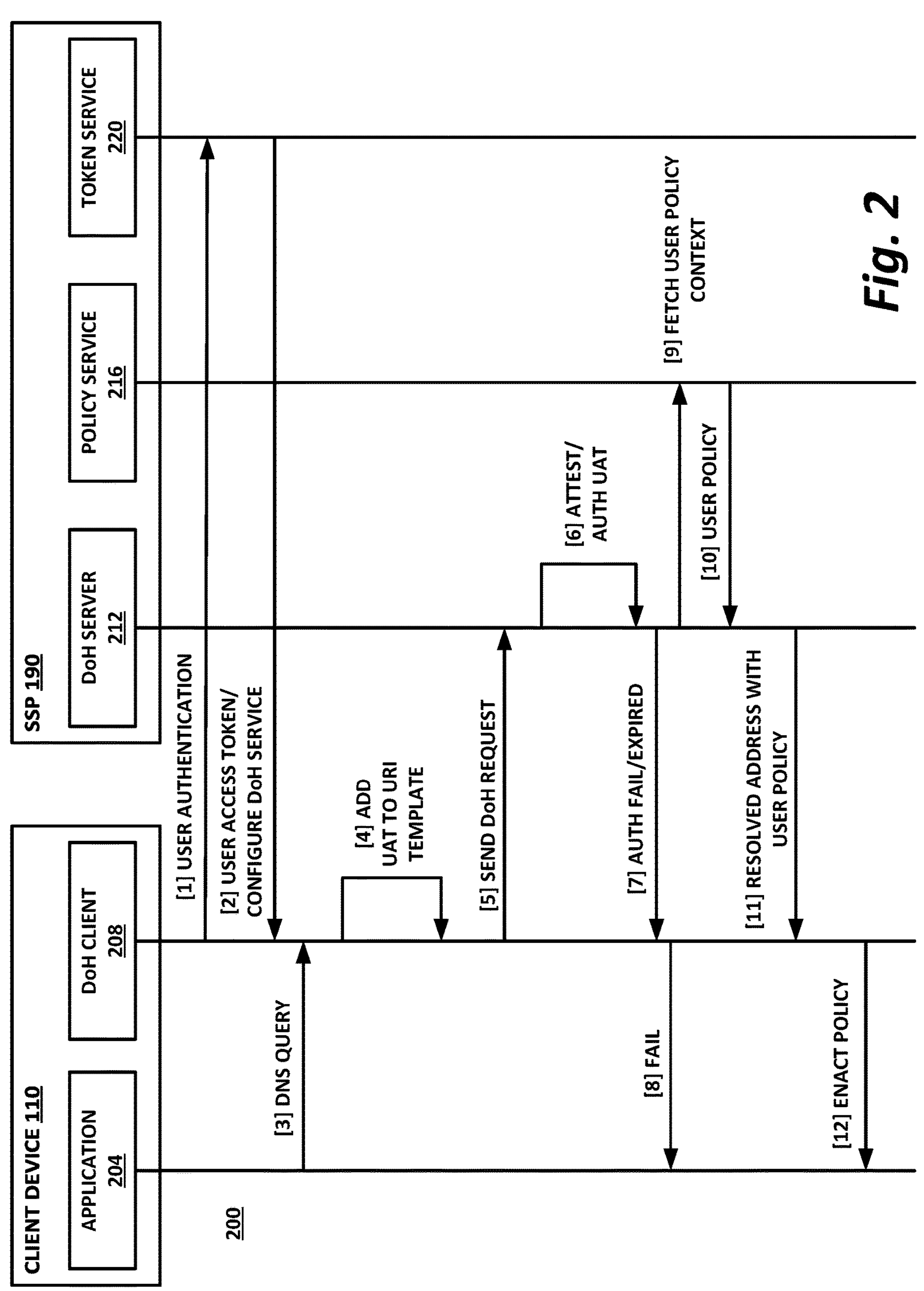
FIG. 2 is a signal flow diagram illustrating selected elements of DNS resolution.

FIG. 2 is a signal flow diagram 200 illustrating communication between a client device 110 and an SSP 190, or other cloud service as appropriate.

At [1], a DoH client 208 performs a user authentication with a token service 220. For example, the user may subscribe to services with SSP 190, and may provide a username, password, certificate, token, or other information to authenticate to token service 220.

In response, at [2] token service 220 provides a user access token (UAT) back to DoH client 208. The UAT may be used to configure DoH client 208, and to prepare it for providing DNS services.

At [3], an application 204 performs a DNS query. This may be, for example, a web browser that the user is operating manually, or it may be a network enabled application that is performing some authorized network application in the background.

Application 204 provides the DNS query to DoH client 208, which at [4] prepares the DoH request. This may include, for example, adding the UAT to a URI template field of the DoH request. After adding the UAT, the DoH request may still comply with applicable standards, such as RFC 8484.

At [5], DoH client 208 sends the DoH request to DoH server 212.

DoH server 212 receives the DoH request, and at [6] may perform authentication to verify that the DoH request is legitimate. This may include authenticating the UAT, such as using a cryptographic attestation, and may also include ensuring that the UAT has not expired. Note that many existing tokens embedded within a URI template have a very short expiry (on the order of 15 minutes). However, the UAT of the present specification need not have such a short expiry in all cases. The expiry may be set for longer time, such as a matter of days or weeks. In a specific example, the expiry is at least longer than a week, but short enough to prevent continued mischief if a UAT is compromised by a third party. For example, the expiry on a UAT may be longer than a week and shorter than six months.

If attestation of the UAT fails, then at [7], DoH server 212 may notify DoH client 208 that authentication failed or that the UAT expired. At [8], DoH client 208 may then signal to application 204 that the DNS request failed.

Alternatively, if the attestation or authentication succeeded in [6], then at [9], DoH server 212 may query a policy service 216 to fetch a user policy context. Policy service 216 may now have access to the identity of the user or other entity that issued the DoH request, and at can return to DoH server 212 an appropriate user policy for the request.

At [11], DoH server 212 returns to DoH client 208 the resolved address with the applicable user policy.

At [12], DoH client 208 provides the resolved IP address (if any) to application 204, and also appropriately enacts the policy as necessary. For example, if the policy is to block the URL, then the response may direct application 204 to a block page, or to an invalid web address. Alternatively, if a warning is to be provided, or other access policies to be enforced, DoH client 208 can provide the necessary instructions for application 204 to enforce the policy.

Figure 3:
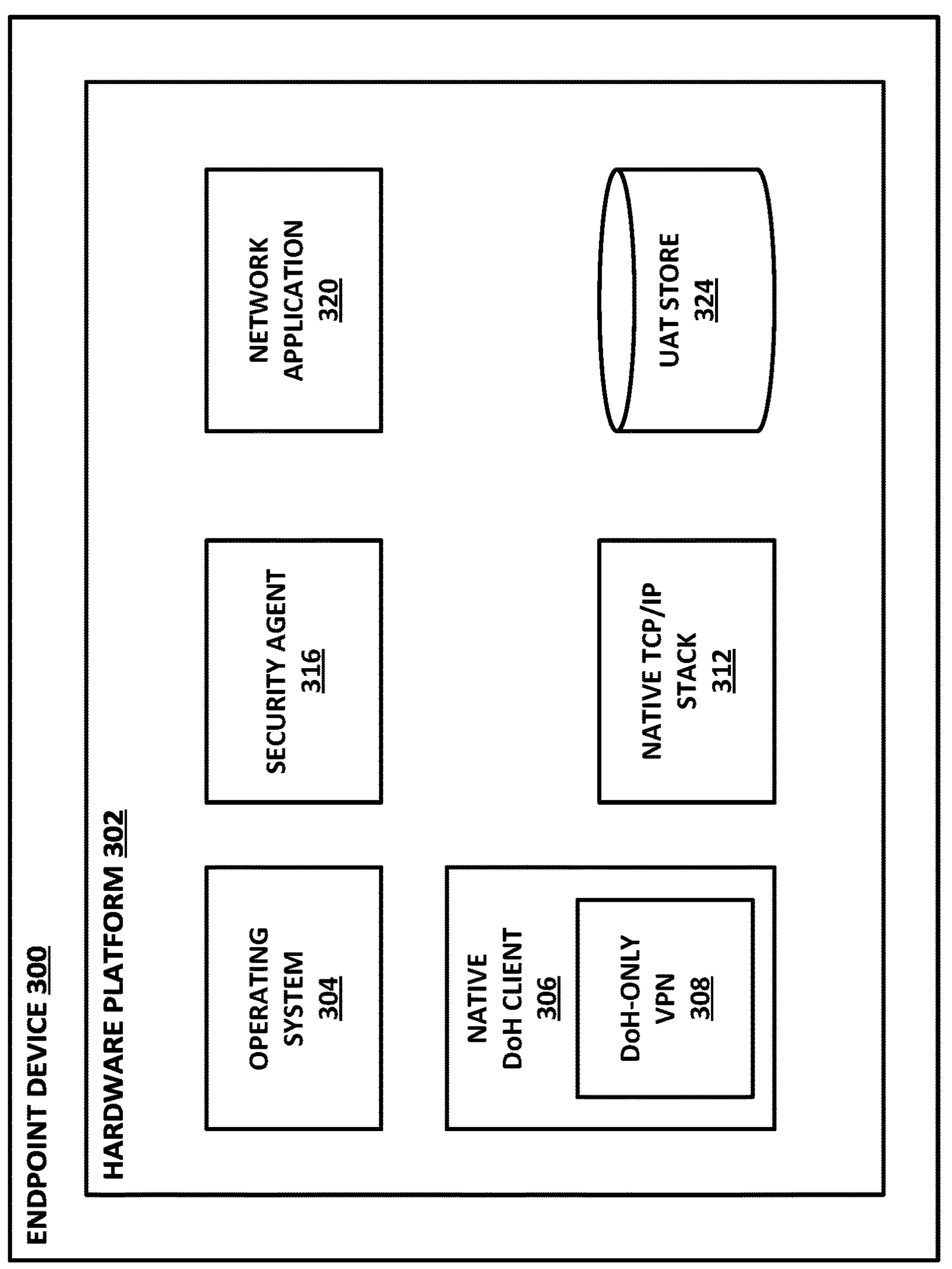
FIG. 3 is a block diagram illustrating selected elements of an endpoint device.

FIG. 3 is a block diagram of selected elements of the of an endpoint device 300, which may be, for example, an instance of client device 110 of FIG. 1, or some other appropriate endpoint device.

Figure 6:
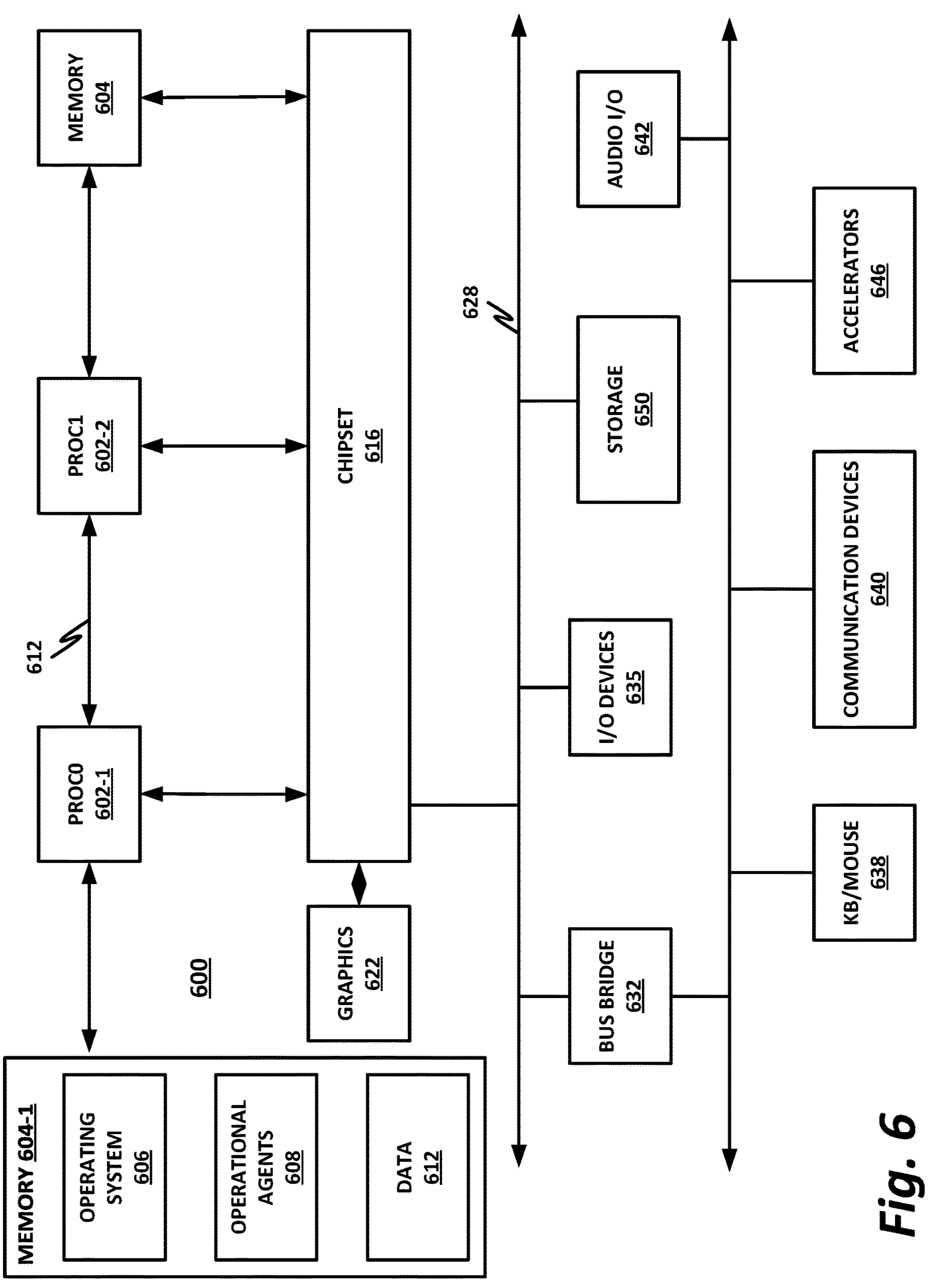
FIG. 6 is a block diagram of selected elements of a hardware platform.

Endpoint device 300 includes a hardware platform 302, which may be, for example, a hardware platform as illustrated in FIG. 6 below. Within hardware platform 302, endpoint device 300 hosts operating system 304. Operating system 304 may provide a native DoH client 306, or a third party DoH client 306 may be provided. A security agent 316 may be provided, for example, to connect endpoint device 300 and SSP 190 (FIG. 1), or other cloud service. Security agent 316 may configure within native DoH client 306 a DoH-only VPN 308. DoH-only VPN 308 provides a VPN that tunnels all DoH requests to the appropriate DoH server provided by the cloud service provider. In an illustrative example, DoH-only VPN 308 is separate from native TCP/IP stack 312. This ensures that VPN 308 does not listen in on or otherwise intercept data packets that pass through native TCP/IP stack 312. Rather, DoH-only VPN 308 operates strictly on DNS resolution operations. This may be another factor in protecting user privacy.

Security agent 316 may maintain a UAT store 324, which may cache UATs for one or more users or entities. When network application 320 wishes to resolve a domain name, the DNS query passes through DoH-only VPN 308 of native DoH client 306. This ensures that the DNS query is appropriately routed to the SSP. Security agent 316 may retrieve an appropriate UAT from UAT store 324, and provide the UAT to DoH-only VPN 308, which can then attach the UAT to a DNS resolution request so that the appropriate user context can be applied to the request.

Figure 4:
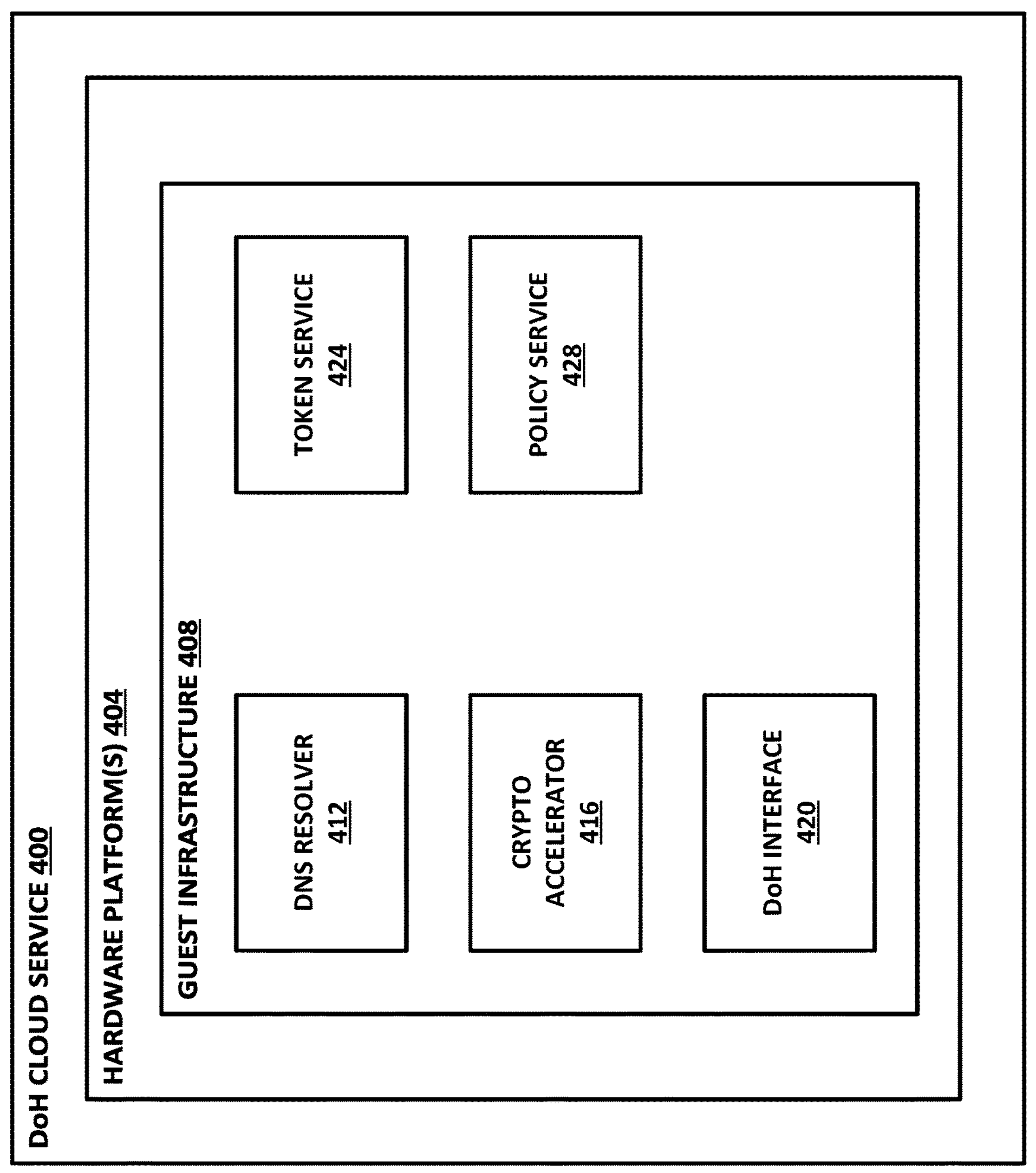
FIG. 4 is a block diagram illustrating selected elements of a cloud service.

FIG. 4 is a block diagram of selected elements of a DoH cloud service 400. DoH cloud service 400 includes one or more hardware platforms 404, which provide the hardware to operate the functions. DoH cloud service 400 may also include a guest infrastructure 408, such as, for example, a virtualization infrastructure as illustrated FIG. 7 below, or a containerization infrastructure as illustrated in FIG. 8 below.

DoH cloud service 400 includes a DoH interface 420, which is a user-facing service that receives DoH queries to be resolved. DoH interface 420 may operate with a crypto accelerator 416, which may accelerate encryption and decryption operations for DoH interface 420. Once DoH interface 420 has decrypted the packet, it may operate DNS resolver 412 to resolve an appropriate domain name for the DoH request. In some cases, DNS resolver 412 may be a caching DNS server that does not maintain a comprehensive database of domain names, but rather that relies on an external DNS service. In cases where unencrypted DNS queries go out from DNS resolver 412, they may advantageously be decoupled from the user context. Thus, even if a malicious actor were able to intercept the DNS queries, he or she would see DNS queries from all users of DoH cloud service 400, and would not have information to connect specific DNS queries with a specific user.

DoH interface 420 may also access a token service 424. Token service 424 may include the logic to attest and verify tokens attached to DoH requests. Token service 424 may also issue new tokens to endpoints on request.

Once DoH interface 420 has extracted a user context from a DoH query, it may query policy service 428 to receive the appropriate user context or policy for the DoH requests. In conjunction with the policy returned by policy service 428, and an IP address returned by DNS resolver 412, DoH interface 420 may return a DoH response to the requesting device.

Figure 5:
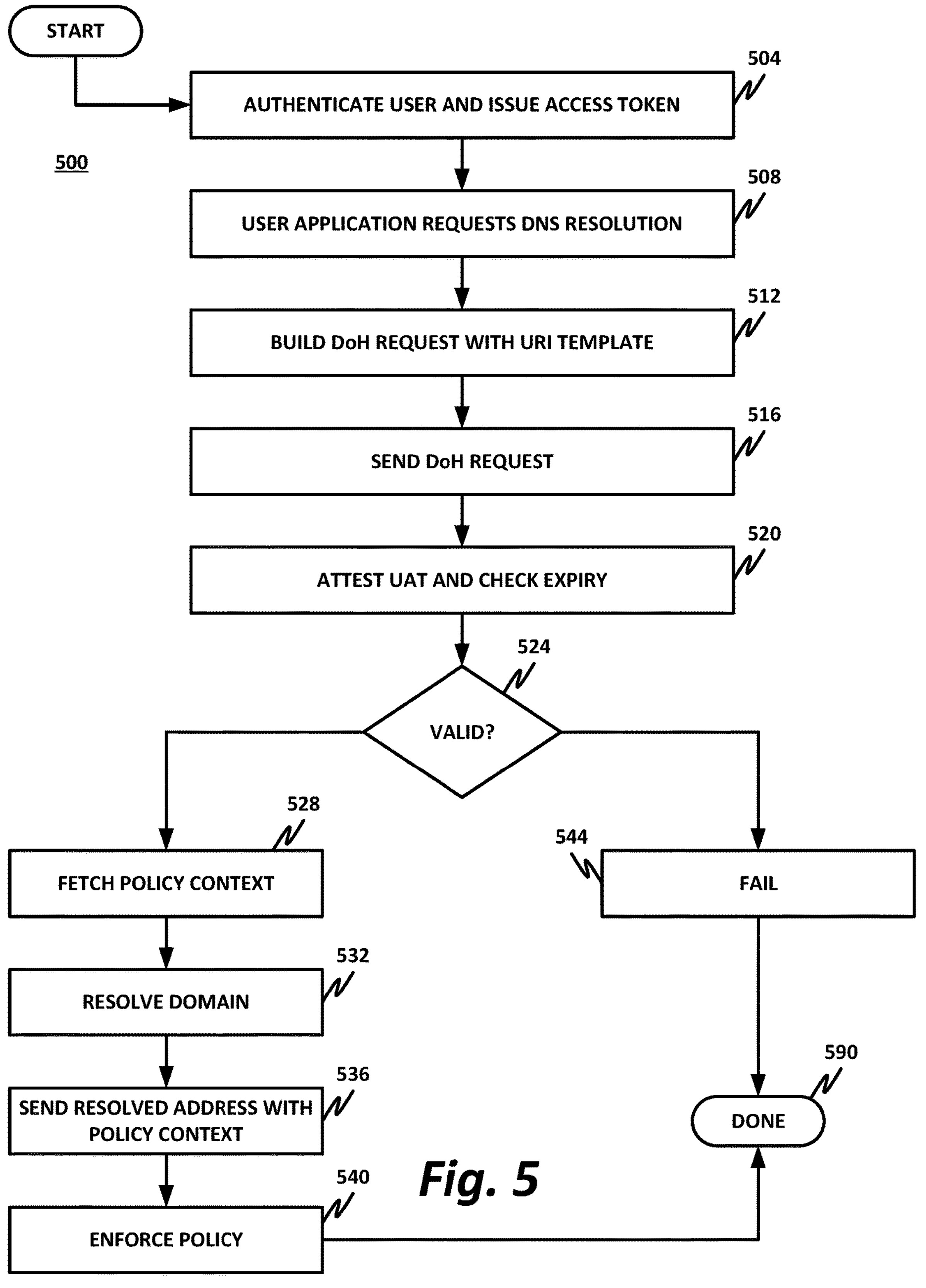
FIG. 5 is a flow chart illustrating selected elements of a DNS resolution method.

FIG. 5 is a flowchart illustrating selected elements of a method 500 of resolving domain names with DoH.

At block 504, and endpoint device provides credentials to a service such as a token service and requests a UAT. The token service authenticates the user or other entity, and in response to successful authentication issues an access token.

In block 508, a user application or other process requests DNS resolution via DoH.

In block 512, the DoH resolver, which may include a DoH-only VPN, builds the DoH request and includes therewith a URI template that includes the UAT.

In block 516, the DoH client sends the DoH request to a DoH server.

In block 520, the DoH server may authenticate or validate the DoH requests, including the UAT. This may include performing a cryptographic attestation on the UAT, including verifying that it was appropriately signed, and that it has not expired.

In decision block 524, if the UAT is not valid (e.g., if the certificate is not properly signed, if it is expired, or if it is otherwise invalid) then in block 544, the DoH query fails.

Returning to decision block 524, if the UAT is valid, then the DoH resolution proceeds.

In block 528, the DoH server queries a policy service for the appropriate policy context according to the attached UAT.

In block 532, the DoH service also resolves the domain name to retrieve the appropriate IP address for the query.

In block 536, the DoH server may return the resolved IP address (if any) along with the policy context information for the query.

In block 540, the endpoint device receives the DoH response packet, and enforces the policy. Enforcing the policy may be as simple as allowing the connection if the domain name is permissible. Other policy enforcement actions are possible, such as blocking the URL, warning the user, throttling the connection, applying a quota, or otherwise applying a policy to the connection.

In block 590, the method is done.

FIG. 6 is a block diagram of a hardware platform 600. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 600, even though they may be scattered across a data center, or even located in different data centers.

Hardware platform 600 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 600 is arranged in a point-to-point (PtP) configuration. This PtP configuration is popular for personal computer (PC) and server-type devices, although it is not so limited, and any other bus type may be used.

Hardware platform 600 is an example of a platform that may be used to implement embodiments of the teachings of this specification. For example, instructions could be stored in storage 650. Instructions could also be transmitted to the hardware platform in an ethereal form, such as via a network interface, or retrieved from another source via any suitable interconnect. Once received (from any source), the instructions may be loaded into memory 604, and may then be executed by one or more processor 602 to provide elements such as an operating system 606, operational agents 608, or data 612.

Hardware platform 600 may include several processors 602. For simplicity and clarity, only processors PROC0 602-1 and PROC1 602-2 are shown. Additional processors (such as 2, 4, 8, 16, 24, 32, 64, or 128 processors) may be provided as necessary, while in other embodiments, only one processor may be provided. Processors may have any number of cores, such as 1, 2, 4, 8, 16, 24, 32, 64, or 128 cores.

Processors 602 may be any type of processor and may communicatively couple to chipset 616 via, for example, PtP interfaces. Chipset 616 may also exchange data with other elements, such as a high performance graphics adapter 622. In alternative embodiments, any or all of the PtP links illustrated in FIG. 6 could be implemented as any type of bus, or other configuration rather than a PtP link. In various embodiments, chipset 616 may reside on the same die or package as a processor 602 or on one or more different dies or packages. Each chipset may support any suitable number of processors 602. A chipset 616 (which may be a chipset, uncore, Northbridge, Southbridge, or other suitable logic and circuitry) may also include one or more controllers to couple other components to one or more central processor units (CPU).

Two memories, 604-1 and 604-2 are shown, connected to PROC0 602-1 and PROC1 602-2, respectively. As an example, each processor is shown connected to its memory in a direct memory access (DMA) configuration, though other memory architectures are possible, including ones in which memory 604 communicates with a processor 602 via a bus. For example, some memories may be connected via a system bus, or in a data center, memory may be accessible in a remote DMA (RDMA) configuration.

Memory 604 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 604 may be used for short, medium, and/or long-term storage. Memory 604 may store any suitable data or information utilized by platform logic. In some embodiments, memory 604 may also comprise storage for instructions that may be executed by the cores of processors 602 or other processing elements (e.g., logic resident on chipsets 616) to provide functionality.

In certain embodiments, memory 604 may comprise a relatively low-latency volatile main memory, while storage 650 may comprise a relatively higher-latency nonvolatile memory. However, memory 604 and storage 650 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 604 and storage 650, for example, in a single physical memory device, and in other cases, memory 604 and/or storage 650 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 622 may be configured to provide a human-readable visual output, such as a command-line interface (CLI) or graphical desktop such as Microsoft Windows, Apple OSX desktop, or a Unix/Linux X Window System-based desktop. Graphics adapter 622 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 622 may include a hardware graphics card, which may have its own memory and its own graphics processing unit (GPU).

Chipset 616 may be in communication with a bus 628 via an interface circuit. Bus 628 may have one or more devices that communicate over it, such as a bus bridge 632, I/O devices 635, accelerators 646, communication devices 640, and a keyboard and/or mouse 638, by way of nonlimiting example. In general terms, the elements of hardware platform 600 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 640 can broadly include any communication not covered by a network interface and the various I/O devices described herein. This may include, for example, various universal serial bus (USB), FireWire, Lightning, or other serial or parallel devices that provide communications.

I/O Devices 635 may be configured to interface with any auxiliary device that connects to hardware platform 600 but that is not necessarily a part of the core architecture of hardware platform 600. A peripheral may be operable to provide extended functionality to hardware platform 600, and may or may not be wholly dependent on hardware platform 600. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 642 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 632 may be in communication with other devices such as a keyboard/mouse 638 (or other input devices such as a touch screen, trackball, etc.), communication devices 640 (such as modems, network interface devices, peripheral interfaces such as PCI or PCIe, or other types of communication devices that may communicate through a network), audio I/O 642, a data storage device 644, and/or accelerators 646. In alternative embodiments, any portions of the bus architectures could be implemented with one or more PtP links.

Operating system 606 may be, for example, Microsoft Windows, Linux, UNIX, Mac OS X, IOS, MS-DOS, or an embedded or real-time operating system (including embedded or real-time flavors of the foregoing). In some embodiments, a hardware platform 600 may function as a host platform for one or more guest systems that invoke application (e.g., operational agents 608).

Operational agents 608 may include one or more computing engines that may include one or more nontransitory computer-readable mediums having stored thereon executable instructions operable to instruct a processor to provide operational functions. At an appropriate time, such as upon booting hardware platform 600 or upon a command from operating system 606 or a user or security administrator, a processor 602 may retrieve a copy of the operational agent (or software portions thereof) from storage 650 and load it into memory 604. Processor 602 may then iteratively execute the instructions of operational agents 608 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

In some cases, the function of an engine is described in terms of a "circuit" or "circuitry to" perform a particular function. The terms "circuit" and "circuitry" should be understood to include both the physical circuit, and in the case of a programmable circuit, any instructions or data used to program or configure the circuit.

Where elements of an engine are embodied in software, computer program instructions may be implemented in programming languages, such as an object code, an assembly language, or a high-level language such as OpenCL, FORTRAN, C, C++, JAVA, or HTML. These may be used with any compatible operating systems or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 600 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fiber Channel, InfiniBand, Wi-Fi, or other suitable standard. Intel Omni-Path Architecture (OPA), TrueScale, Ultra Path Interconnect (UPI) (formerly called QuickPath Interconnect, QPI, or KTI), FibreChannel, Ethernet, FibreChannel over Ethernet (FCOE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 600 may be virtualized, in particular the processor(s) and memory. For example, a virtualized environment may run on OS 606, or OS 606 could be replaced with a hypervisor or virtual machine manager. In this configuration, a virtual machine running on hardware platform 600 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 6 may be combined in a SoC architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIGURE QC. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 7:
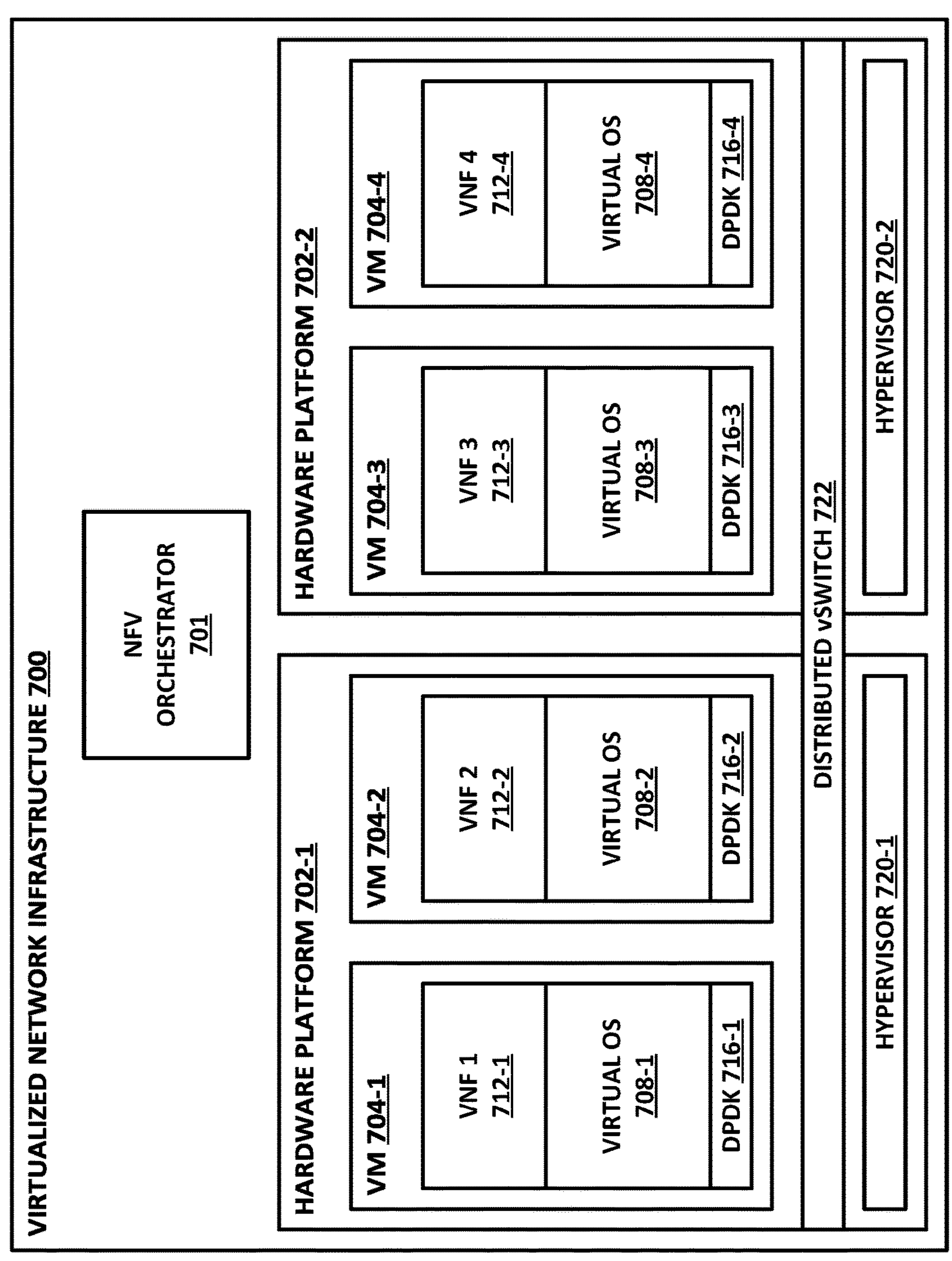
FIG. 7 is a block diagram of selected elements of a network function virtualization (NFV) infrastructure.
Figure 8:
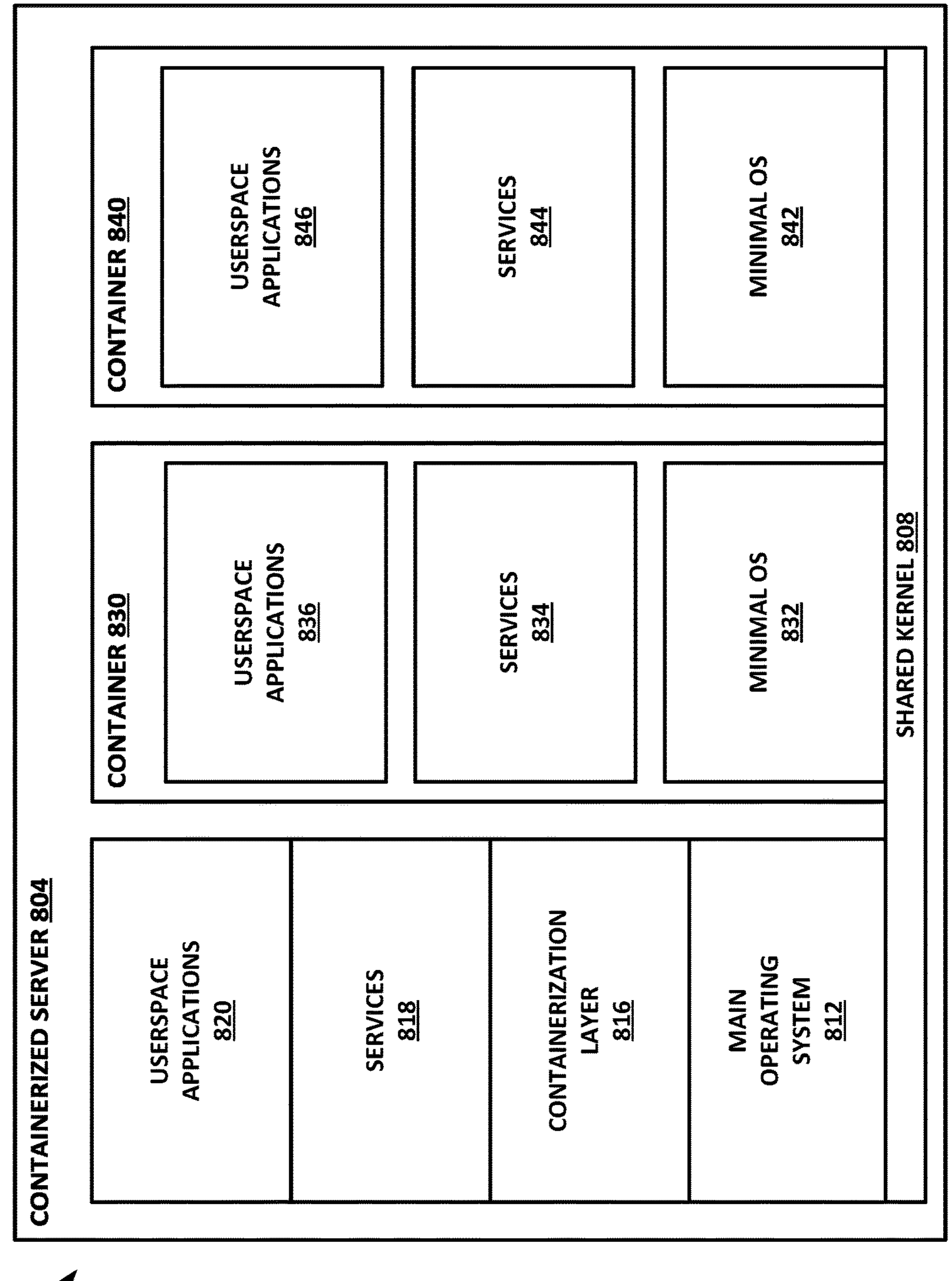
FIG. 8 is a block diagram of selected elements of a containerization infrastructure.

FIG. 7 is a block diagram of a NFV infrastructure 700. NFV is an example of virtualization, and the virtualization infrastructure here can also be used to realize traditional VMs. Various functions described above may be realized as VMs, including cloud functions.

NFV is generally considered distinct from software defined networking (SDN), but they can interoperate together, and the teachings of this specification should also be understood to apply to SDN in appropriate circumstances. For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be VMs). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 700. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 7, an NFV orchestrator 701 may manage several VNFs 712 running on an NFVI 700. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 701 a valuable system resource. Note that NFV orchestrator 701 may provide a browser-based or graphical configuration n interface, and in some embodiments may be integrated with SDN orchestration functions.

Note that NFV orchestrator 701 itself may be virtualized (rather than a special-purpose hardware appliance). NFV orchestrator 701 may be integrated within an existing SDN system, wherein an operations support system (OSS) manages the SDN. This may interact with cloud resource management systems (e.g., OpenStack) to provide NFV orchestration. An NFVI 700 may include the hardware, software, and other infrastructure to enable VNFs to run. This may include a hardware platform 702 on which one or more VMs 704 may run. For example, hardware platform 702-1 in this example runs VMs 704-1 and 704-2. Hardware platform 702-2 runs VMs 704-3 and 704-4. Each hardware platform 702 may include a respective hypervisor 720, virtual machine manager (VMM), or similar function, which may include and run on a native (bare metal) operating system, which may be minimal so as to consume very few resources. For example, hardware platform 702-1 has hypervisor 720-1, and hardware platform 702-2 has hypervisor 720-2.

Hardware platforms 702 may be or comprise a rack or several racks of blade or slot servers (including, e.g., processors, memory, and storage), one or more data centers, other hardware resources distributed across one or more geographic locations, hardware switches, or network interfaces. An NFVI 700 may also include the software architecture that enables hypervisors to run and be managed by NFV orchestrator 701.

Running on NFVI 700 are VMs 704, each of which in this example is a VNF providing a virtual service appliance. Each VM 704 in this example includes an instance of the Data Plane Development Kit (DPDK) 716, a virtual operating system 708, and an application providing the VNF 712. For example, VM 704-1 has virtual OS 708-1, DPDK 716-1, and VNF 712-1. VM 704-2 has virtual OS 708-2, DPDK 716-2, and VNF 712-2. VM 704-3 has virtual OS 708-3, DPDK 716-3, and VNF 712-3. VM 704-4 has virtual OS 708-4, DPDK 716-4, and VNF 712-4.

Virtualized network functions could include, as nonlimiting and illustrative examples, firewalls, intrusion detection systems, load balancers, routers, session border controllers, DPI services, network address translation (NAT) modules, or call security association.

The illustration of FIG. 7 shows that a number of VNFs 704 have been provisioned and exist within NFVI 700. This FIGURE does not necessarily illustrate any relationship between the VNFs and the larger network, or the packet flows that NFVI 700 may employ.

The illustrated DPDK instances 716 provide a set of highly-optimized libraries for communicating across a virtual switch (vSwitch) 722. Like VMs 704, vSwitch 722 is provisioned and allocated by a hypervisor 720. The hypervisor uses a network interface to connect the hardware platform to the data center fabric (e.g., a host fabric interface (HFI)). This HFI may be shared by all VMs 704 running on a hardware platform 702. Thus, a vSwitch may be allocated to switch traffic between VMs 704. The vSwitch may be a pure software vSwitch (e.g., a shared memory vSwitch), which may be optimized so that data are not moved between memory locations, but rather, the data may stay in one place, and pointers may be passed between VMs 704 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 722 is illustrated, wherein vSwitch 722 is shared between two or more physical hardware platforms 702.

FIG. 8 is a block diagram of selected elements of a containerization infrastructure 800. Like virtualization, containerization is a popular form of providing a guest infrastructure. Various functions described herein may be containerized, including cloud functions.

Containerization infrastructure 800 runs on a hardware platform such as containerized server 804. Containerized server 804 may provide processors, memory, one or more network interfaces, accelerators, and/or other hardware resources.

Running on containerized server 804 is a shared kernel 808. One distinction between containerization and virtualization is that containers run on a common kernel with the main operating system and with each other. In contrast, in virtualization, the processor and other hardware resources are abstracted or virtualized, and each virtual machine provides its own kernel on the virtualized hardware.

Running on shared kernel 808 is main operating system 812. Commonly, main operating system 812 is a Unix or Linux-based operating system, although containerization infrastructure is also available for other types of systems, including Microsoft Windows systems and Macintosh systems. Running on top of main operating system 812 is a containerization layer 816. For example, Docker is a popular containerization layer that runs on a number of operating systems, and relies on the Docker daemon. Newer operating systems (including Fedora Linux 32 and later) that use version 2 of the kernel control groups service (cgroups v2) feature appear to be incompatible with the Docker daemon. Thus, these systems may run with an alternative known as Podman that provides a containerization layer without a daemon.

Various factions debate the advantages and/or disadvantages of using a daemon-based containerization layer (e.g., Docker) versus one without a daemon (e.g., Podman). Such debates are outside the scope of the present specification, and when the present specification speaks of containerization, it is intended to include any containerization layer, whether it requires the use of a daemon or not.

Main operating system 812 may also provide services 818, which provide services and interprocess communication to userspace applications 820.

Services 818 and userspace applications 820 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main operating system 812, they inherit the same file and resource access permissions as those provided by shared kernel 808. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 804, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e. containerized server 804).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors-especially type 1, or "bare metal," hypervisors-provide such near-native performance that this advantage may not always be realized.

In this example, containerized server 804 hosts two containers, namely container 830 and container 840.

Container 830 may include a minimal operating system 832 that runs on top of shared kernel 808. Note that a minimal operating system is provided as an illustrative example, and is not mandatory. In fact, container 830 may perform as full an operating system as is necessary or desirable. Minimal operating system 832 is used here as an example simply to illustrate that in common practice, the minimal operating system necessary to support the function of the container (which in common practice, is a single or monolithic function) is provided.

On top of minimal operating system 832, container 830 may provide one or more services 834. Finally, on top of services 834, container 830 may also provide userspace applications 836, as necessary.

Container 840 may include a minimal operating system 842 that runs on top of shared kernel 808. Note that a minimal operating system is provided as an illustrative example, and is not mandatory. In fact, container 840 may perform as full an operating system as is necessary or desirable. Minimal operating system 842 is used here as an example simply to illustrate that in common practice, the minimal operating system necessary to support the function of the container (which in common practice, is a single or monolithic function) is provided.

On top of minimal operating system 842, container 840 may provide one or more services 844. Finally, on top of services 844, container 840 may also provide userspace applications 846, as necessary.

Using containerization layer 816, containerized server 804 may run discrete containers, each one providing the minimal operating system and/or services necessary to provide a particular function. For example, containerized server 804 could include a mail server, a web server, a secure shell server, a file server, a weblog, cron services, a database server, and many other types of services. In theory, these could all be provided in a single container, but security and modularity advantages are realized by providing each of these discrete functions in a discrete container with its own minimal operating system necessary to provide those services.

The foregoing outlines features of several embodiments so that those skilled in the art may better understand various aspects of the present disclosure. The foregoing detailed description sets forth examples of apparatuses, methods, and systems relating to providing entity policy contexts for secure DNS resolution, according to one or more embodiments of the present disclosure. Features such as structure (s), function(s), and/or characteristic(s), for example, are described with reference to one embodiment as a matter of convenience; various embodiments may be implemented with any suitable one or more of the described features.

As used throughout this specification, the phrase "an embodiment" is intended to refer to one or more embodiments. Furthermore, different uses of the phrase "an embodiment" may refer to different embodiments. The phrases "in another embodiment" or "in a different embodiment" refer to an embodiment different from the one previously described, or the same embodiment with additional features.

For example, "in an embodiment, features may be present. In another embodiment, additional features may be present." The foregoing example could first refer to an embodiment with features A, B, and C, while the second could refer to an embodiment with features A, B, C, and D, with features, A, B, and D, with features, D, E, and F, or any other variation.

In the foregoing description, various aspects of the illustrative implementations may be described using terms commonly employed by those skilled in the art to convey the substance of their work to others skilled in the art. It will be apparent to those skilled in the art that the embodiments disclosed herein may be practiced with only some of the described aspects. For purposes of explanation, specific numbers, materials, and configurations are set forth to provide a thorough understanding of the illustrative implementations. In some cases, the embodiments disclosed may be practiced without specific details. In other instances, well-known features are omitted or simplified so as not to obscure the illustrated embodiments.

For the purposes of the present disclosure and the appended claims, the article "a" refers to one or more of an item. The phrase "A or B" is intended to encompass the "inclusive or," e.g., A, B, or (A and B). "A and/or B" means A, B, or (A and B). For the purposes of the present disclosure, the phrase "A, B, and/or C" means A, B, C, (A and B), (A and C), (B and C), or (A, B, and C).

The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a nonvolatile memory. Thus, for example, an "engine" as described above could include instructions encoded within a volatile or nonvolatile memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, nontransitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, nontransitory computer-readable storage media having stored thereon executable instructions that, when executed, cause a hardware platform or other computing system, to carry out a method or procedure. For example, the instructions could be executable object code, including software instructions executable by a processor. The one or more tangible, nontransitory computer-readable storage media could include, by way of illustrative and nonlimiting example, a magnetic media (e.g., hard drive), a flash memory, a ROM, optical media (e.g., CD, DVD, Blu-Ray), nonvolatile random-access memory (NVRAM), nonvolatile memory (NVM) (e.g., Intel 3D Xpoint), or other nontransitory memory.

There are also provided herein certain methods, illustrated for example in flow charts and/or signal flow diagrams. The order or operations disclosed in these methods discloses one illustrative ordering that may be used in some embodiments, but this ordering is not intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected elements. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

To aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A computer-implemented method of providing domain name system (DNS) over hypertext transfer protocol secure (HTTPS) (i.e., DoH) resolution for a domain, comprising:

forming an encrypted DoH query for a person or group of persons, comprising encoding an entity access token into a uniform resource identifier (URI) template, wherein the entity access token comprises an account identifier for the person or group of persons;

sending the encrypted DoH query to a DoH service;

resolving the encrypted DoH query, comprising decrypting the DoH query and using the entity access token to determine access policy for the person or group of persons, wherein the access policy relates to permission for the person or group of persons to access to a website associated with the DoH query;

returning a DoH response with an IP address for the website; and enforcing the access policy on a user endpoint device.

2. The computer-implemented method of claim 1, wherein the URI template is a Request for Comments (RFC) 8484 URI template.

3. The computer-implemented method of claim 1, wherein the access policy comprises a policy to block access to the domain.

4. The computer-implemented method of claim 1, wherein the access policy comprises a policy to warn on access to the domain.

5. The computer-implemented method of claim 1, further comprising issuing the entity access token after the person or group of persons has authenticated.

6. The computer-implemented method of claim 1, wherein the entity access token has an expiry.

7. The computer-implemented method of claim 6, wherein the expiry is greater than one week.

8. The computer-implemented method of claim 1, wherein the entity access token has the form of a JSON web token.

9. The computer-implemented method of claim 1, wherein the entity access token is encoded in base64.

10. The computer-implemented method of claim 1, wherein the entity access token is encoded in base64-url.

11. The computer-implemented method of claim 1, wherein forming the encrypted DoH query comprises inserting a virtual private network (VPN) instance into a DoH service driver.

12. The computer-implemented method of claim 11, wherein the VPN instance is segregated from a network data path.

13. The computer-implemented method of claim 1, wherein the person or group of persons is a human user, a user group, a business unit, or an enterprise.

14. One or more tangible, nontransitory computer-readable storage media having stored thereon executable instructions to:

provide a virtual private network (VPN) to interoperate with a domain name system (DNS) over hypertext transfer protocol secure (HTTPS) (i.e., DoH) resolution client, wherein the VPN is segregated from network data streams;

receive, from a human user, a request to resolve a domain name;

form an encrypted DoH query for the human user, comprising encoding account identifier for the human user into a uniform resource identifier (URI) template, and encrypting the DoH query;

send the encrypted DoH query to a DoH resolution server;

receive an encrypted response from the DoH resolution server, wherein the encrypted response includes an IP address for a website the human user is attempting to access and/or a permission policy for accessing the website; and enforcing the permission policy.

15. The one or more tangible, nontransitory computer-readable storage media of claim 14, wherein the URI template is a Request for Comments (RFC) 8484 URI template.

16. The one or more tangible, nontransitory computer-readable storage media of claim 14, wherein the permission policy comprises a policy to block or warn on access to the domain name.

17. The one or more tangible, nontransitory computer-readable storage media of claim 14, wherein the account identifier is encoded in base64-url.

18. The one or more tangible, nontransitory computer-readable storage media of claim 14, wherein account identifier has an expiry.

19. One or more tangible, nontransitory computer-readable storage media having stored thereon instructions to provide a domain name system (DNS) over hypertext transfer protocol secure (HTTPS) (i.e., DoH) resolution server, the instructions to:

receive, from a client device, an encrypted DoH resolution request for a domain on behalf of a human user, wherein the encrypted DoH resolution request includes an account token associated with the human user encoded within a URI template of the encrypted DoH resolution request;

decrypt the DoH resolution request;

resolve the domain, comprising finding an IP address for the domain and using the account token to locate an access permission policy for the human user related to the domain; and returning an encrypted DoH response, including the IP address and/or the access permission policy.

20. The one or more tangible, nontransitory computer-readable storage media of claim 19, wherein the URI template is an RFC 8484 URI template.

* * * * *